Oct. 25, 1927.  1,646,929
A. A. PHELAN
CRACKING STILL
Filed Nov. 1, 1926
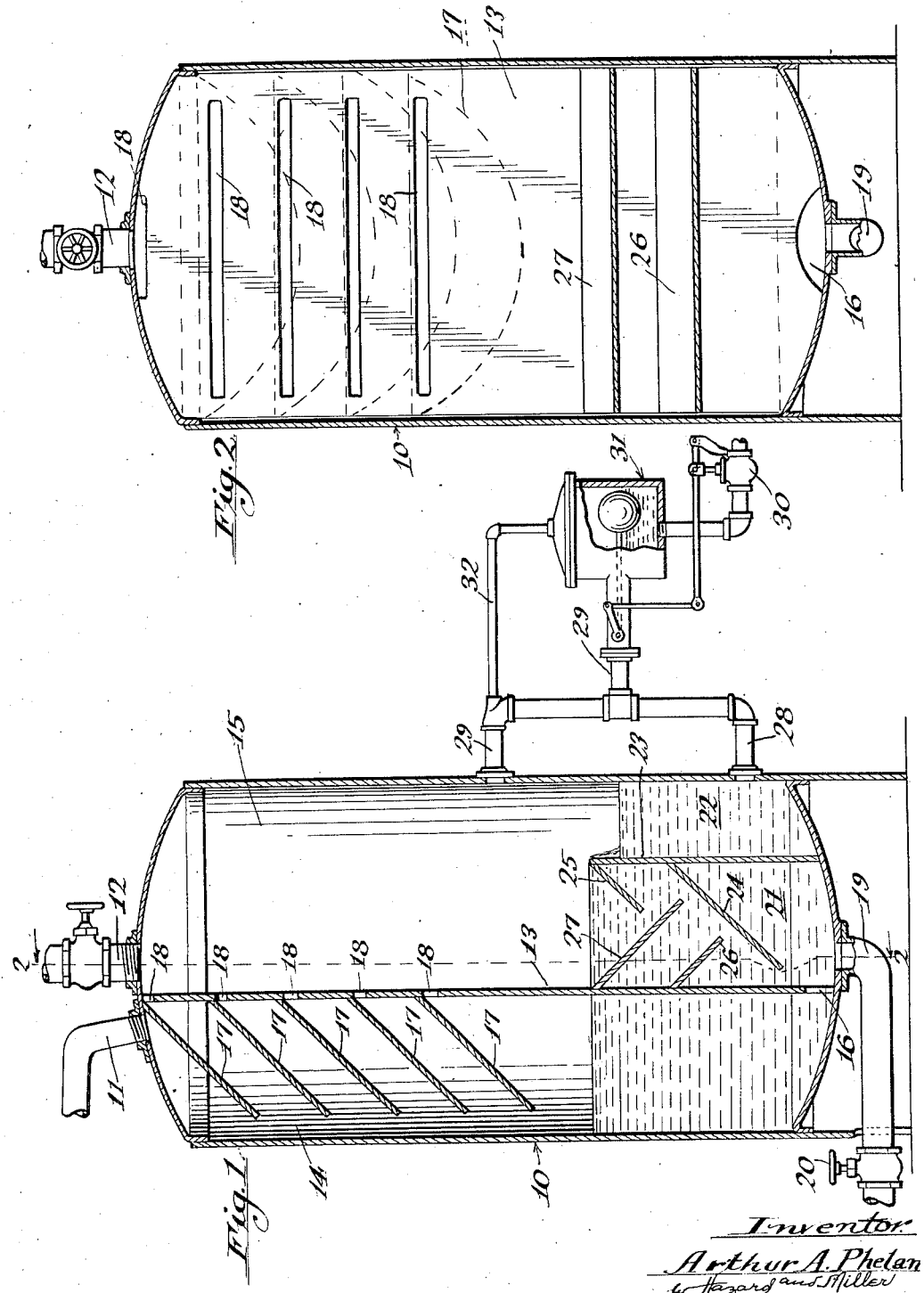

Patented Oct. 25, 1927.

1,646,929

UNITED STATES PATENT OFFICE.

ARTHUR A. PHELAN, OF LOS ANGELES, CALIFORNIA.

CRACKING STILL.

Application filed November 1, 1926. Serial No. 145,521.

My invention relates to the cracking of mineral oils and especially to the removal of carbon formed during the cracking process.

The formation of free carbon during the cracking process of mineral oils is a source of trouble in the apparatus, due to the local overheating of parts of the apparatus caused by free carbon accumulation; blistering, buckling and sagging result and breakdowns are of frequent occurrences.

It is an object of the present invention to provide an apparatus whereby the free carbon formed during the cracking process is removed in a continuous manner.

In this connection it may be pointed out that without the continuous removal of carbon its accumulation in an apparatus, normally slow at first, proceeds progressively as the reaction chamber and the like becomes fouled and flocculent free carbon is carried with the vapors to the detriment of all parts of the apparatus.

The continuous removal of carbon as provided for in this invention thus lessens the wear and tear, lengthens the endurance and promotes the efficiency of all parts of the apparatus; it is particularly beneficial to tubes, retorts, stills, heating or preheating chambers and the like, as the constant and cumulative gathering of carbon in the parts referred to due to the recycling, refluxing or the addition of new material to be cracked in thus prevented.

Profitable disposal of free carbon is one of the problems of the mineral oil products industry. The separation of vapor, liquid and free carbon as provided by my apparatus makes it possible to utilize the carbon as plant fuel, while still retaining its heat and being concentrated in a quantity of liquid sufficient to allow it to flow freely to any point where it may be utilized as fuel. If not so utilized it is taken and settled, filtered or otherwise treated before entering again the cycle of operation.

My invention consists of the combination and arrangement of parts hereinafter described and claimed.

In the accompanying drawings, which form a part of this specification I have illustrated an embodiment of my invention and in which Figure 1 is a vertical cross section of the apparatus;

Fig. 2 is a vertical cross section of the apparatus taken on line 2—2 of Fig. 1.

Referring to the drawings, 10 indicates a still, preferably cylindrical in shape, having at the top thereof a heated liquid inlet 11 and a vapor outlet 12. A vertical partition 13 extending from the top of the still 10 and between the liquid inlet 11 and the vapor outlet 12, extends downwardly to the bottom of the still dividing the still into two chambers, the one which receives the liquid inlet I shall call the liquid receiving chamber 14 and the other in which the vapor outlet is located, the vapor outlet chamber 15. As will be observed, I prefer to make the vapor outlet chamber 15 of considerable larger size than the liquid receiving chamber 14. At the bottom of the partition 13 I provide an opening 16 affording communication between the two chambers. I arrange a series of baffle plates 17 in the liquid receiving chamber 14 which extend from the partition 13 at an angle downwardly, the outer ends of which are spaced from the walls of the still 10. Immediately below the plane of attachment of each baffle plate 17 I provide in the partition 13 a vapor opening 18. At the bottom of the still there is a carbon outlet pipe 19 controlled by valve 20.

In the vapor outlet chamber 15 I divide the lower part into two compartments, the one adjacent to the partition 13 being a carbon precipitation compartment 21 and the other being the overflow compartment 22, by means of a short vertical wall 23 extending upwardly from the bottom of the still 10. The wall 23 has two baffle plates extending downwardly at an angle into the carbon precipitation compartment 21, the lower one 24 being preferably longer than the upper baffle plate 25. Extending into the same chamber 21 from the partition 13 are two baffle plates 26 and 27, the lower ends of which are spaced from the baffle plate 24, as clearly shown in Figure 1. It will also be noted that the baffle plate 25 is spaced from baffle plate 26, thus causing the liquid flowing upwardly through the chamber 21 to travel in a zig-zag path to overflow into overflow chamber 22.

The liquid leaves the still through outlet pipe 28, the same being in communication with a pressure equalizer pipe 29, which leads from the vapor chamber 15 above the liquid level in the still. The liquid flows from pipes 28 and 29 to a discharge valve 30 controlled by a liquid level control device 31 of any preferred construction. A small equalizing pressure pipe 32 connects the overflow chamber with the pressure equalizing pipe 29.

*Operation.*—The crude oil, which may be heated from 700 to 850° F. or even higher and under a pressure from 50 to 200 lbs. enters the liquid receiving chamber 14 through the inlet pipe 11, flowing down the inclined baffle plates 17 to the bottom of the still, the liquid accumulating therein both in the liquid receiving chamber 14 and vapor outlet chamber 15 by reason of the opening 16, until the proper liquid level is reached, which will be the head of vertical partition 23 in the vapor outlet chamber 15. The overflow in said partition 23 will be removed by valve controlled outlet 28, as explained.

The vapor and gases liberated from the liquid and entering the liquid receiving chamber 14 will pass underneath baffle plates 17 and through vapor outlet openings 18 into vapor chamber 15 and out to the vapor outlet 12. The arrangement of the baffle plates 17 and the vapor openings 18 prevent the free flocculent carbon from being carried into the vapor outlet chamber 15 and out with the vapors and gases through the outlet 12. The carbon will be retained in the liquid and will accumulate in the lower part of the still. The baffle plates 24, 25, 26 and 27 in the carbon precipitation chamber will prevent the free carbon from rising to the top of the liquid therein and cause the same to gradually settle into the carbon outlet pipe 19 whence it may be removed continuously or periodically by the operation of valve 20. The carbon free liquid is removed from the still through pipe 28 controlled by the liquid level control device 31.

An important feature of the invention is the separation of the light hydrocarbons from the liquid and carbon which takes place in liquid chamber 14 by the vaporization of the more volatile constituents of the liquid. The flash point of the mixture of carbon and mineral oil in the carbon removed through carbon outlet pipe 19 is sufficiently raised to render the carbon mixed with the oil suitable for plant fuel.

Various changes in the construction and arrangement of parts may be made by those skilled in the art without departing from the spirit of my invention as claimed.

I claim:

1. In an apparatus of the character described the combination of a closed tank having a heated liquid inlet at the top, a vapor outlet at the top, a vertical partition extending from the top and between the liquid inlet and vapor outlet to the bottom of the tank dividing said tank into a liquid receiving chamber and a vapor outlet chamber respectively, an opening in the lower part of said partition affording communication between the liquid receiving chamber and the vapor outlet chamber, a series of downwardly inclined baffle plates in the liquid receiving chamber extending from said partition, the outer ends of said baffle plates being spaced from the walls of the tank, vapor openings in the partition immediately below said baffle plates, a valve controlled carbon outlet at the bottom of the tank, a short vertical partition in the vapor outlet chamber extending upwardly from the bottom of the tank and dividing the lower part thereof into a carbon precipitation compartment and an overflow compartment respectively, a series of downwardly inclined and oppositely arranged baffle plates in said carbon precipitation compartment, a liquid outlet from the overflow compartment and a liquid level valve controlling said liquid outlet.

2. In an apparatus of the character described the combination of a closed tank having a heated liquid inlet and a vapor outlet, a vertical partition between the inlet and outlet extending from the top of the tank vertically to the bottom, said partition dividing the tank into a liquid receiving chamber and a vapor outlet chamber respectively, an opening in the lower part of said partition affording communication between the liquid receiving chamber and the vapor outlet chamber, a series of downwardly inclined baffle plates in the liquid receiving chamber extending from said partition, the outer ends of said baffle plates being spaced from the walls of the tank, vapor openings in the partition immediately below said baffle plates, a valve controlled carbon outlet at the bottom of the tank, a short vertical partition in the vapor outlet chamber dividing the lower part thereof into a carbon precipitation compartment and an overflow compartment respectively, a series of oppositely arranged baffle plates in said carbon precipitation compartment and a liquid outlet from the overflow compartment.

3. In an apparatus of the character decribed the combination of a closed tank having a heated liquid inlet and a vapor outlet, a vertical partition extending between the liquid inlet and the vapor outlet to the bottom of the tank dividing said tank into a liquid receiving chamber and a vapor outlet chamber respectively, a passage in the lower part of said partition between the liquid receiving chamber and the vapor outlet chamber, a series of baffle plates in the liquid receiving chamber, vapor openings in the partition, a carbon outlet at the bottom of the tank, a short vertical partition in the vapor outlet chamber dividing the lower part thereof into a carbon precipitation compartment and an overflow compartment respectively, a series of baffle plates in said carbon precipitation compartment and liquid outlet from the overflow compartment.

4. In an apparatus of the character described the combination of a closed tank having a heated liquid inlet and a vapor outlet, a partition extending from the top and between the liquid inlet and vapor outlet to the bottom of the tank dividing said tank into a liquid receiving chamber and a vapor outlet chamber respectively, a passage in the lower part of said partition affording communication between the liquid receiving chamber and the vapor outlet chamber, a series of baffling devices arranged in the liquid receiving chamber, vapor openings in the partition affording communication between the liquid receiving chamber and the vapor outlet chamber, a carbon outlet at the bottom of the tank, a partition wall in the vapor outlet chamber dividing the lower part thereof into a carbon precipitation compartment and an overflow compartment respectively and a liquid outlet from the overflow compartment.

5. In an apparatus of the character described the combination of a closed tank having a heated liquid inlet and a vapor outlet, a partition extending from the top and between the liquid inlet and vapor outlet to the bottom of the tank dividing said tank into a liquid receiving chamber and a vapor outlet chamber respectively, a passage in the lower part of said partition affording communication between the liquid receiving chamber and the vapor outlet chamber, a series of baffling devices arranged in the liquid receiving chamber, vapor openings in the partition affording communication between the liquid receiving chamber and the vapor outlet chamber, a carbon outlet at the bottom of the tank and a liquid outlet from the vapor outlet chamber.

6. In an apparatus of the character described the combination of a closed tank having a heated liquid inlet and a vapor outlet, a partition extending from the top and between the liquid inlet and vapor outlet to the bottom of the tank dividing said tank into a liquid receiving chamber and a vapor outlet chamber respectively, a passage in said lower part of said partition affording communication between the liquid receiving chamber and the vapor outlet chamber, a vapor opening in the upper part of the partition affording communication between the liquid receiving chamber and the vapor outlet chamber, a carbon outlet at the bottom of the tank and a liquid outlet from the vapor outlet chamber.

In testimony whereof I have signed my name to this specification.

ARTHUR A. PHELAN.